US008511478B2

(12) United States Patent
Terzini

(10) Patent No.: US 8,511,478 B2
(45) Date of Patent: Aug. 20, 2013

(54) CONTAINER DISPERSION WHEEL

(75) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 295 days.

(21) Appl. No.: 13/059,972

(22) PCT Filed: Aug. 21, 2009

(86) PCT No.: PCT/US2009/054621
§ 371 (c)(1),
(2), (4) Date: Feb. 19, 2011

(87) PCT Pub. No.: WO2010/022336
PCT Pub. Date: Feb. 25, 2010

(65) Prior Publication Data
US 2011/0153066 A1 Jun. 23, 2011

Related U.S. Application Data

(60) Provisional application No. 61/090,901, filed on Aug. 22, 2008, provisional application No. 61/112,776, filed on Nov. 10, 2008.

(51) Int. Cl.
*B07C 7/04* (2006.01)
(52) U.S. Cl.
USPC ............ 209/705; 209/583; 209/621; 209/706
(58) Field of Classification Search
USPC .................. 209/583, 621, 705, 706
See application file for complete search history.

(56) References Cited

U.S. PATENT DOCUMENTS

| | | | | |
|---|---|---|---|---|
| 3,361,141 A | * | 1/1968 | Weisskopf | 453/11 |
| 3,823,844 A | | 7/1974 | Linkemer et al. | |
| 3,871,156 A | | 3/1975 | Koenig et al. | |
| 3,903,773 A | * | 9/1975 | Furukawa | 83/208 |
| 3,960,292 A | * | 6/1976 | Knapp | 221/211 |
| 4,379,509 A | * | 4/1983 | Bohle | 209/598 |
| 5,337,919 A | | 8/1994 | Spaulding et al. | |
| 5,630,347 A | * | 5/1997 | Elvio | 83/210 |
| 5,671,592 A | | 9/1997 | Yuyama et al. | |
| 5,771,657 A | | 6/1998 | Lasher et al. | |
| 6,561,377 B1 | | 5/2003 | Pearson et al. | |
| 6,611,733 B1 | | 8/2003 | De la Huerga | |

(Continued)

FOREIGN PATENT DOCUMENTS

| | | |
|---|---|---|
| WO | WO-2005-060917 A1 | 7/2005 |
| WO | WO-2007-124406 A3 | 11/2007 |
| WO | WO-2008-003759 A3 | 6/2008 |

*Primary Examiner* — Terrell Matthews
(74) *Attorney, Agent, or Firm* — Polsinelli PC

(57) ABSTRACT

A multi-pharmaceutical dispensing station includes a circular platform around which a plurality of individual dispensers is arrayed at a convenient loading height. Cylindrical, empty prescription containers bearing indicia of the patient and pharmaceutical to be dispensed into each container. Incident containers first enter an entraining column, where sensors detect the indicia and determine the proper dispenser to which to direct the container. The containers then drop into a dispersion wheel which translates them around the circular station and aligns them with a vertical chute leading to the designated dispenser. Slidable gates cover the chutes until the transport system determines they are above the proper dispenser, then open to drop the containers into the designated dispenser. The dispersion wheel may be used in other applications, such as container content verification, and may include container processing stations along its perimeter for processing the containers before sending them on.

15 Claims, 16 Drawing Sheets

(56) References Cited

U.S. PATENT DOCUMENTS

| | | |
|---|---|---|
| 6,775,589 B2 | 8/2004 | William et al. |
| 7,017,623 B2 | 3/2006 | Tribble et al. |
| 7,139,639 B2 | 11/2006 | Broussard et al. |
| 7,255,247 B2 | 8/2007 | Aylward |
| 2003/0089581 A1 | 5/2003 | Thompson et al. |
| 2003/0111484 A1 | 6/2003 | Pearson et al. |
| 2003/0183642 A1 | 10/2003 | Kempker |
| 2004/0004085 A1 | 1/2004 | Williams et al. |
| 2004/0123567 A1 | 7/2004 | McErlean et al. |
| 2006/0120835 A1 | 6/2006 | Pressman |
| 2006/0167586 A1 | 7/2006 | Kobayashi et al. |
| 2006/0277269 A1 | 12/2006 | Dent et al. |
| 2008/0041872 A1 | 2/2008 | Shows et al. |
| 2008/0140252 A1 | 6/2008 | Handfield et al. |
| 2008/0288105 A1 | 11/2008 | Mauger et al. |

\* cited by examiner

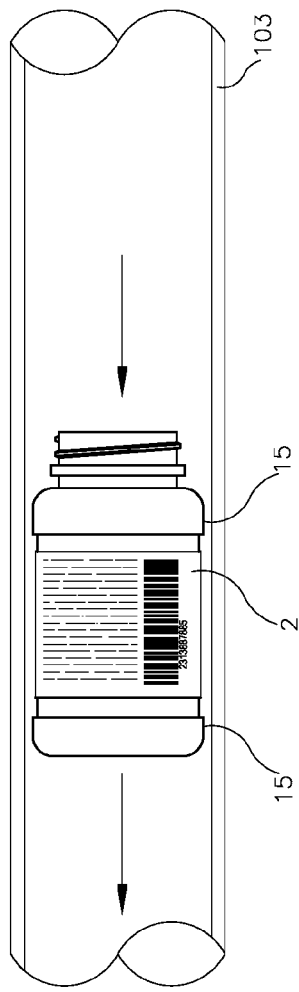
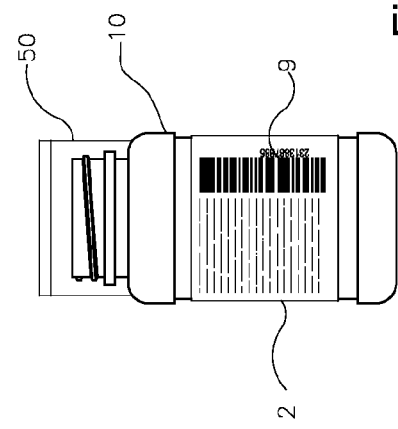
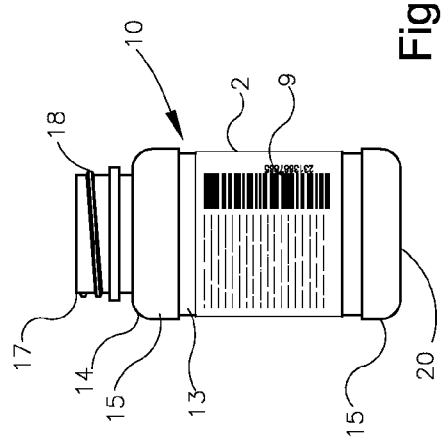
Figure 3D
Figure 3C
Figure 3B

CONTAINER DISPERSION WHEEL This application is a continuation-in-part of, and claims priority to, a U.S. Provisional Application Ser. No. 61/090,901, filed Aug. 22, 2008. This application also claims priority to U.S. Provisional Application Ser. No. 61/112,776, filed Nov. 10, 2008.

BACKGROUND OF THE INVENTION

1. Field of the Invention

This invention relates generally to automated pharmaceutical distribution systems and particularly to the stage in such systems where prescription containers and the pharmaceuticals they are to contain are brought together. More particularly, this invention relates to apparatus for receiving, dispersing and directing empty prescription containers to pharmaceutical dispensers where the containers are filled, sealed and sent to content verification, packaging and shipping systems downstream thereof.

2. Description of Related Art

NOTE: hereinafter, the present invention is discussed in the context of a preferred embodiment for an automated pharmaceutical prescription-filling system, but one having ordinary skill in the art will recognize that the present invention, along with the principles and practices thereof, may be utilized for filling containers of any small objects, and that all such small object container filling applications are considered to be within the spirit and scope of the present invention.

Automated pharmaceutical prescription-filling systems answer a need for high-volume pharmaceutical deliveries. Coupled with the use of mail order delivery service, automated, central filling of prescriptions has been highly successful in lowering costs of providing drugs to consumers. Benefits include increased volume, lower costs, fewer pharmacy personnel, inventory control, substance control, automated documentation, and quick turn-around times. Equally importantly, such systems assume most of the drudgery and relieve professional pharmacists from the tedium and fatigue of monitoring a multitude of high-volume orders, thereby reducing rates of medication errors.

Some recent automated systems remain relatively labor intensive. Automated dispensing machines which count out tablets or capsules often still require manual intervention, such as a pharmacist or technician positioning a container under the correct pill dispensing chute, or further manually handling the container before shipping. A system which automatically associates empty containers with their intended pharmaceuticals, dispenses the pharmaceuticals into the containers, seals the containers and forwards them to shipping would achieve the high volume throughput with the added benefits of accuracy and relief for pharmacists.

Directing empty containers to the proper location where a specified type and quantity of pharmaceuticals is dispensed into them creates its own challenges. Automated prescription filling systems necessarily must manage a large quantity and significant variety of diverse pharmaceuticals to turn a profit. The space required for such systems can be enormous when one considers the peripheral conveyors, sensors, gates, motors and the like needed to direct and convey any given prescription container to its assigned pharmaceutical dispenser, and then to extract it and forward it to shipping. A need exists for space-saving apparatus and procedures to optimize automated prescription filling services.

SUMMARY OF THE INVENTION

A multi-pharmaceutical dispensing station includes a circular platform around which a plurality of individual dispensers is arrayed at a convenient loading height. Cylindrical, empty prescription containers bearing indicia of the patient and pharmaceutical to be dispensed into each container. Incident containers first enter an entraining column, where sensors detect the indicia and determine the proper dispenser to which to direct the container. The containers then drop into a dispersion wheel which translates them around the circular station and aligns them with a vertical chute leading to the designated dispenser. Slidable gates cover the chutes until the transport system determines they are above the proper dispenser, then open to drop the containers into the designated dispenser. The dispersion wheel may be used in other applications, such as container content verification, and may include container processing stations along its perimeter for processing the containers before sending them on.

BRIEF DESCRIPTION OF THE DRAWINGS

The novel features believed characteristic of the present invention are set forth in appended claims. The invention itself, however, as well as a preferred mode of use and further objects and advantages thereof, will best be understood by reference to the following detailed description of an illustrative embodiment when read in conjunction with the accompanying drawings, wherein:

FIGS. 3A-3D detail a container used in the prescription filling system of FIG. 1.

DESCRIPTION OF A PREFERRED EMBODIMENT

Figure 1:
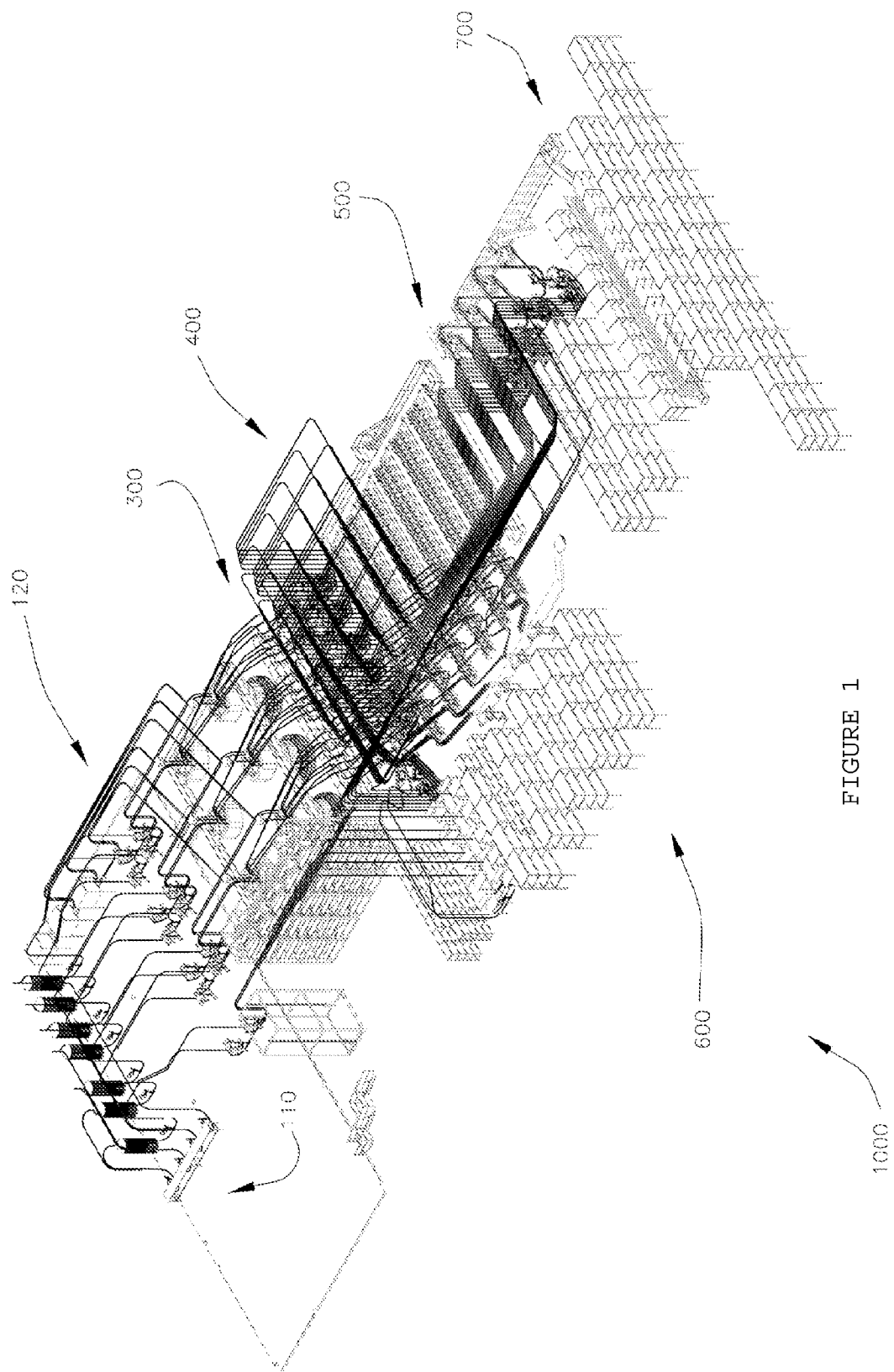
FIG. 1 shows in quartering perspective view an automated prescription filling system utilizing the prescription container filling system of the present invention.
Figure 2:
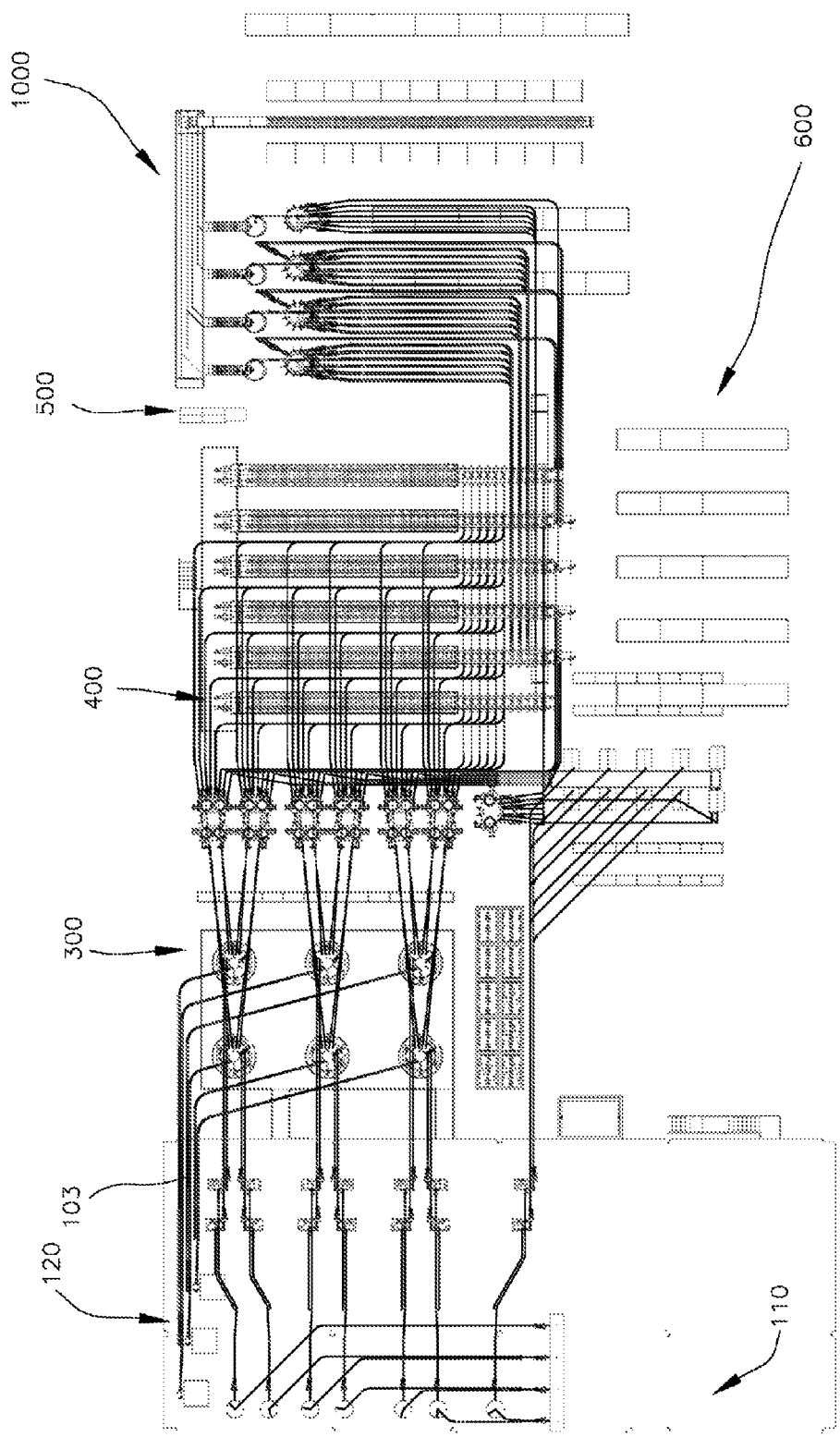
FIG. 2 depicts the automated prescription filling system of FIG. 1 in top plan view.
Figure 3A:
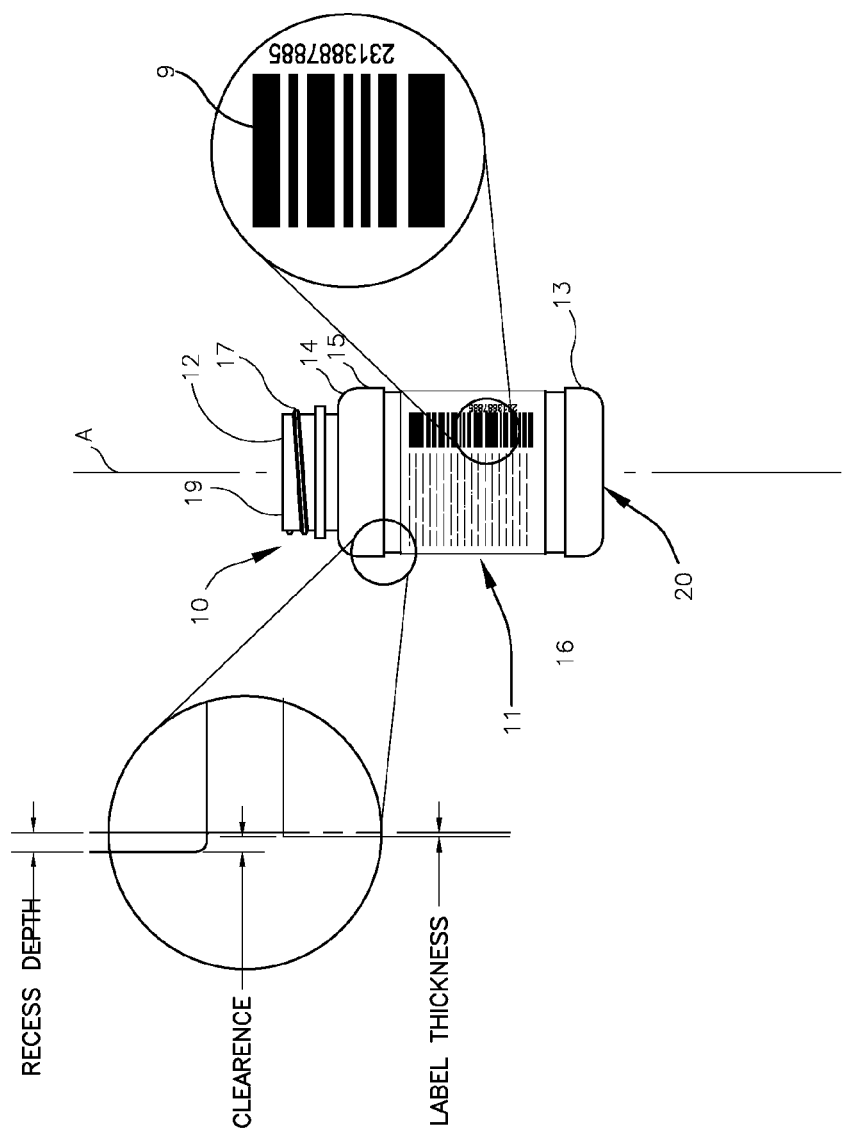
Figure 4:
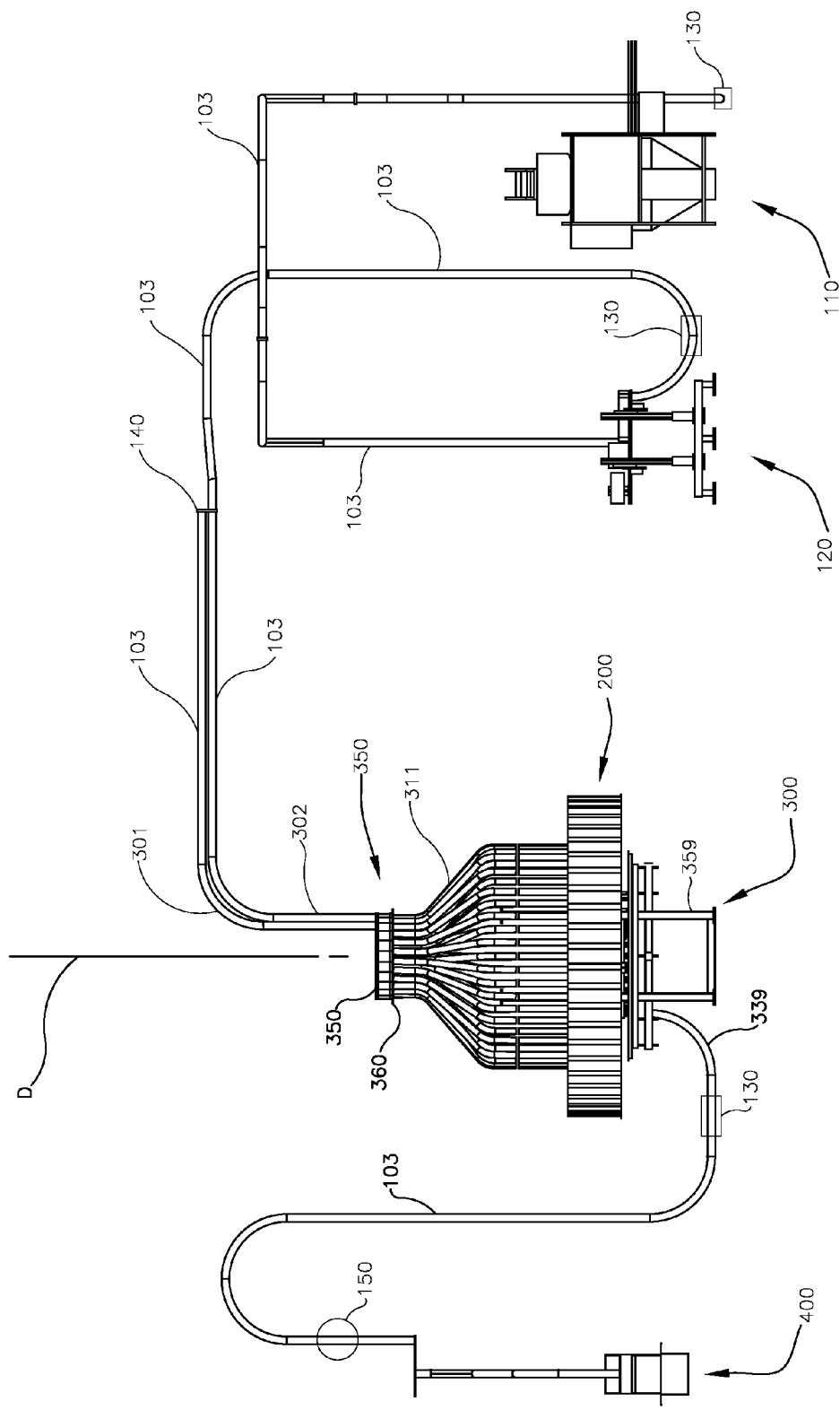
FIG. 4 shows in side elevational view one channel of the automated prescription filling system of FIG. 1, with the container filling apparatus of the present invention.

Referring now to the figures, and particularly to FIGS. 1, 2 and 4, automated prescription filling system 1000 comprises prescription dispensing apparatus 300 feeding filled prescription containers 10 (see FIG. 4) through prescription verification stage 400 and sortation conveyor system 500 to bagging, packaging and shipping system 600 where filled prescriptions are conveyed through common carriers to pharmacies, hospitals and individual patients (collectively "customers"). Apparatus 300 comprises a stage where containers 10 are filled according to each individual prescription from an array of individual pharmaceutical dispensers 200 and sealed by automated closure system 160. Bottles 10 then are transported to verification stage 400 where a pharmacist confirms that each container 10 contains the pharmaceutical required, then to conveyor 500 where container 10 is collected with other containers 10 for the same customer before being packaged at stage 600 and shipped, all without requiring human hands to handle containers 10 or their pharmaceutical contents.

Pharmaceutical dispensers 200 are the subject matter of a previously filed U.S. patent application Ser. No. 12/396,417 filed Mar. 2, 2009, now pending. Pneumatic container transport system 100 also is the subject matter of a U.S. provisional patent application, Ser. No. 61/090,900 filed Aug. 22, 2008, now pending. Prescription verification system 400, is the subject matter of a U.S. provisional patent application, Ser. No. 61/091,346 filed Aug. 23, 2008, and of U.S. provisional patent application, Ser. No. 61/112,776 filed Nov. 10, 2008, both now pending. All of the foregoing pending U.S. patent applications are hereby incorporated herein by reference. Still further, apparatus 300, which brings empty but labeled prescription containers together at pharmaceutical dispensers 200 for filling, closure and forwarding to the downstream stages of verification 400, sortation 500 and autopackaging 600, is the subject matter of a separate application to be filed substantially simultaneously herewith. This application is for dispersion wheel 350 which receives containers 10 and disperses each of them to one of a plurality of destinations according to predetermined criteria.

NOTE: hereinafter, the present invention is discussed in the context of a preferred embodiment utilizing prescription bottles, but one having ordinary skill in the art will recognize that other types of containers having similar features may be substituted and still considered to be within the spirit and scope of the present invention. Further, it will be recognize that capping system 160 and 330 as described herein will be altered as needed to accommodate containers 10 which are not bottles or which utilize different closure and sealing means.

NOTE also that hereinafter, as it serves the purpose, the term "system 1000" may be personified and discussed as carrying out operations of certain apparatus. One having ordinary skill in the art will recognize that to do so, system 1000 necessarily includes controller means (not shown) typically comprising a computer coupled to sensors, gates, actuators and the like within system 1000. Such computer typically has a central processor, a quantum of random access memory, at least one fixed data storage device, a graphical user interface and at least one user input device (none shown). Said computer further includes at least one computer program operable to read sensor information, such as bar code indicia disposed on containers 10 and various components of dispensers 200 (discussed in more detail below), and to issue commands to devices such as gates and actuators to carry out the specified operations. For example, said controller means monitors the location and status of each container 10 as it arrives at said dispensing station 300; operates said dispensing station 200 to direct said containers to one of said dispensers 200 for filling, sealing and discharge; stores in a database on said dynamic storage device a record of said contents of each of said containers; and displays to a user (not shown) on said graphical user interface the status of each container 10 and dispenser 200 in response to input from said user with the user input device (not shown). All of these operations are discussed in more detail below as being carried out by system 1000.

Prescription Containers and Container Induction, Labeling and Transport

Turning first to FIGS. 3A-3D, container 10 comprises a bottle having a regular, generally cylindrical cross section composed of walls 11 surrounding and concentric about longitudinal axis A and defining interior 12 into which a plurality of pharmaceuticals P (see FIG. 11) are dispensed by dispensers 200. Bottle 10 is closed at bottom 20 opposite shoulders 14 where it reduces to neck 17 bearing threads 18 adapted to mate with a cylindrical cap 50 (not shown; see FIGS. 12A-14) which closes and seals bottle 10. Though larger than neck 17, cap 50's diameter remains slightly smaller than that of walls 11 to remain within the profile of bottle 10.

Disposed within annular recess 13 between shoulders 14 and bottom 20, label 2 bears indicia 9, comprising a bar code or other machine readable encoding, adapted to inform prescription filling system 1000 and its various sensors and software (not shown), through use of a dynamically populated database, of the contents and expected location of bottle 10 within prescription filling system 1000. Bottle 10 is adapted to move, bottom 20 first, through pneumatic tubing 103 between the various stages of system 1000 (FIG. 1). Impellers 130 (FIG. 4) disposed at the beginning of each run of tubes 103, provide impetus to move bottles 10 through tubes 103 between stages.

Referring now again to FIGS. 1, 2 and 4, it will be understood that bottles 10 enter system 1000 uncapped, and that caps 50 must be placed on bottles 10 to seal them after they have been filled by dispensers 200 within stage 300. The bottle capping system 160, 330 is discussed in more detail herein below.

Bottles 10 are manufactured separately and provided in bulk to system 1000. Bottles 10 are inducted into system 1000 by first placing them into unscrambler 110 which first reorients them all with their bottoms 20 facing the same direction and then drops them single file into tube 103 to be conveyed to labeling machines 120. Labelers 120 print labels 2, complete with indicia 9, and apply them to annular recesses 13 on walls 11 of bottles 10. Labeler 120 then sends bottles 10 on to pharmaceutical dispensing system 300 for filling. Preferably, labels 2 carry indicia 9 of the patient's identity and the content and quantity of the pharmaceutical to be dispensed into bottle 10 to which it is attached. One having ordinary skill in the art will recognize that indicia 9 may comprise any unique identifying information that is capable of distinguishing each bottle 10 from the others within system 1000, and that all such forms of indicia are considered to be within the spirit and scope of the present invention. Once bottles 10 receive label 2, prescription filling system 1000 tracks the prescription for said customer by following the location and status of each bottle 10.

Referring again now to FIG. 4, labelers 120 feed bottles 10 one at a time into a single tube 103, but they arrive at dispensing station 300 in either of two entry channels 301, 302. Which entry channel 301, 302 that bottles 10 enter is determined by system 1000 according to dispenser 200 from which bottle 10 must be filled. System 1000 selects channels 301, 302 by operating diverter 140 to route bottle 10 from tube 103 into one or the other of paired tubes 103 each of which leads to one of channels 301, 302.

One having ordinary skill in the art will recognize that FIG. 4 represents a simplified schematic of a tubular pneumatic container transport system for bottles 10 which employs labelers 120 feeding multiple dispensing stations 300, and that diverters 140 will be employed by system 1000 as needed to optimize throughput of bottles 10 moving through system 1000. For example, depending upon the throughput speed of stations 300, several labelers 120 might be required to keep up with it, necessitating a plurality of diverters 140 to direct bottles 10 into the proper one of channels 301, 302. One having ordinary skill in the art further will recognize that all combinations of unscramblers 110, labelers 120 and diverters 140 necessary to feed bottles 10 to each station 300 to optimize throughput are considered to be within the spirit and scope of the present invention.

Dispensing Station

Figure 5:
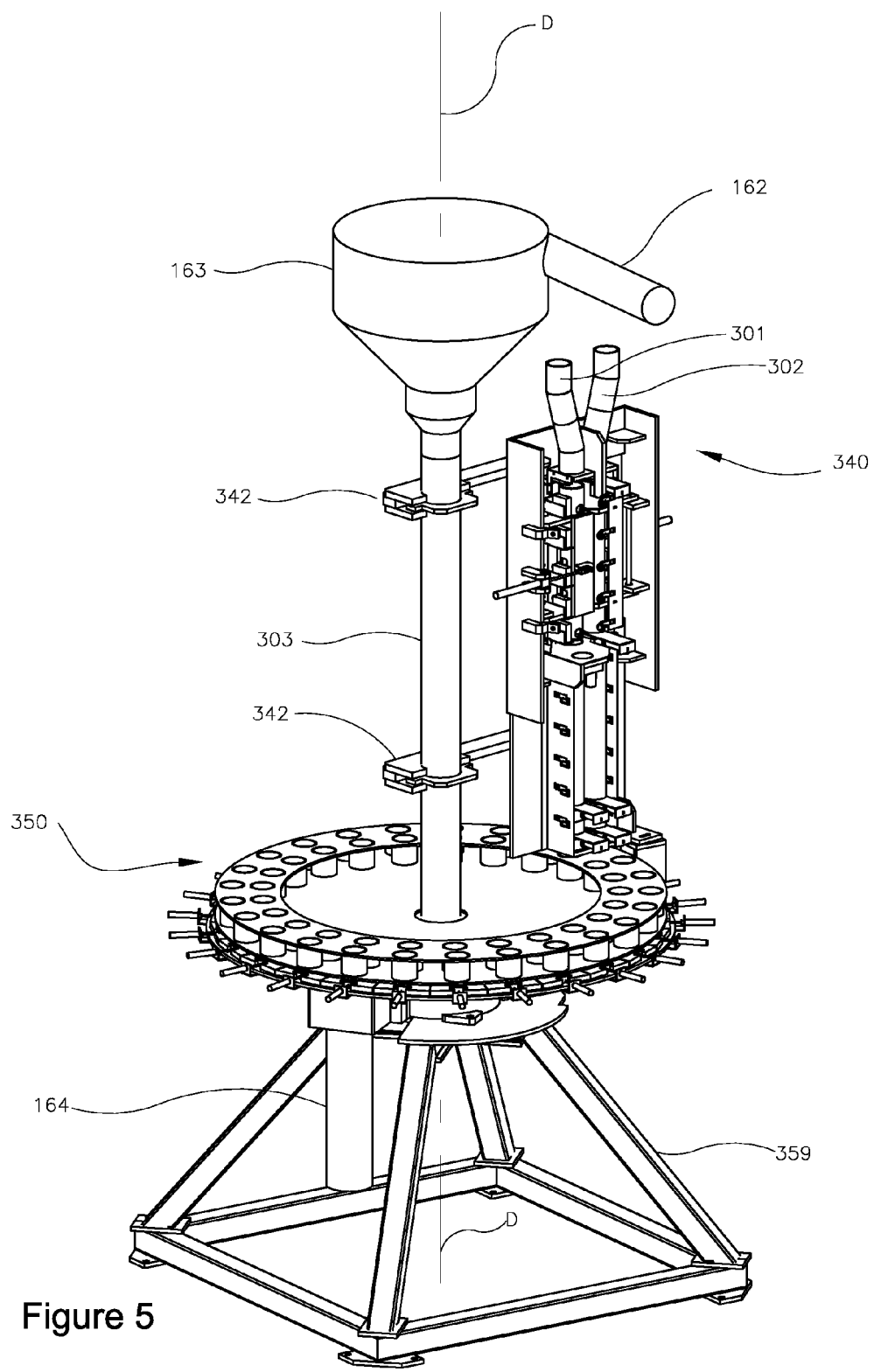
FIG. 5 depicts in perspective view the top portion of the container filling apparatus of the present invention.
Figure 6:
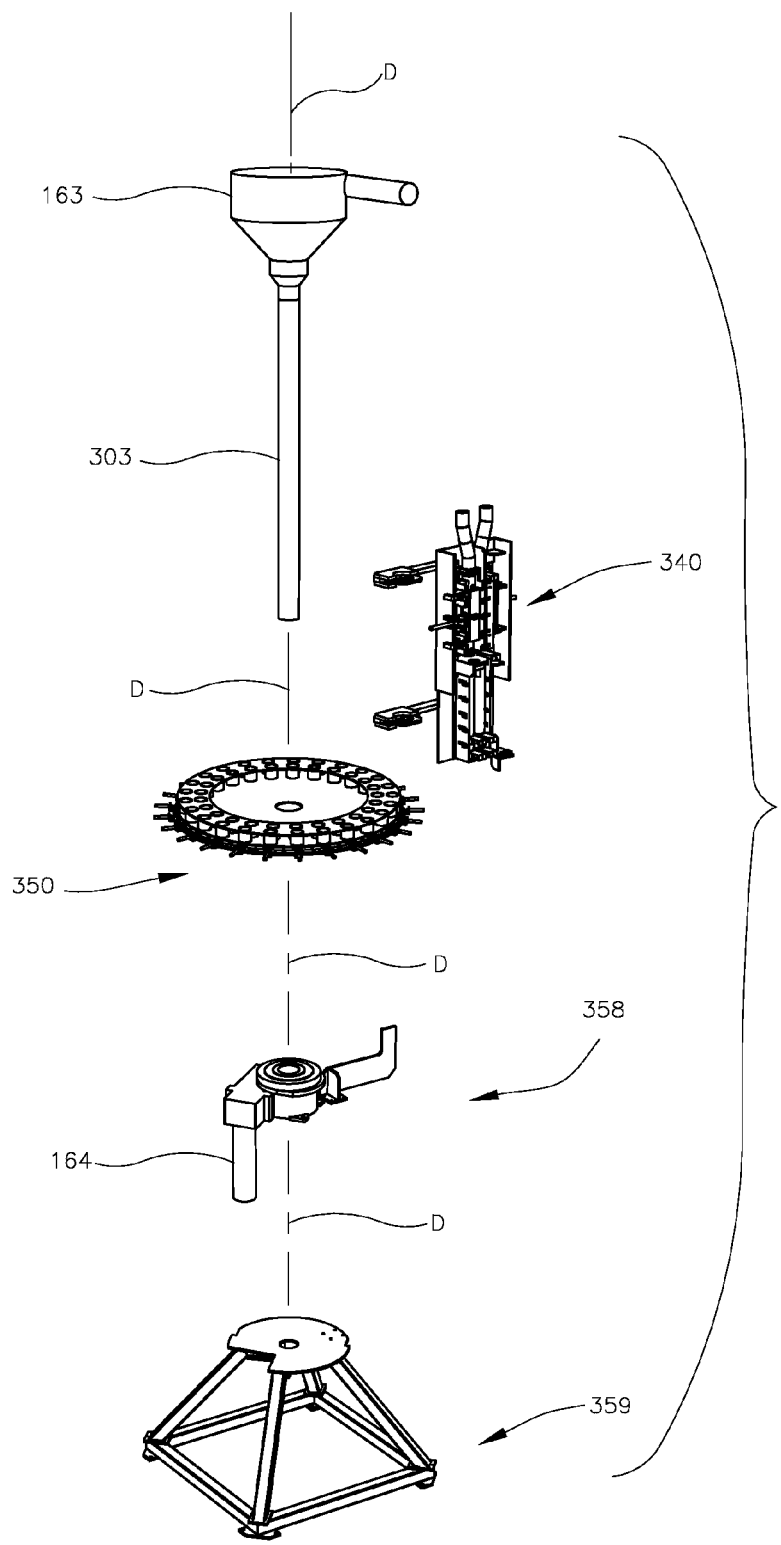
FIG. 6 depicts in perspective view the top portion of the present invention shown in FIG. 5 vertically exploded to reveal its major components.
Figure 7:
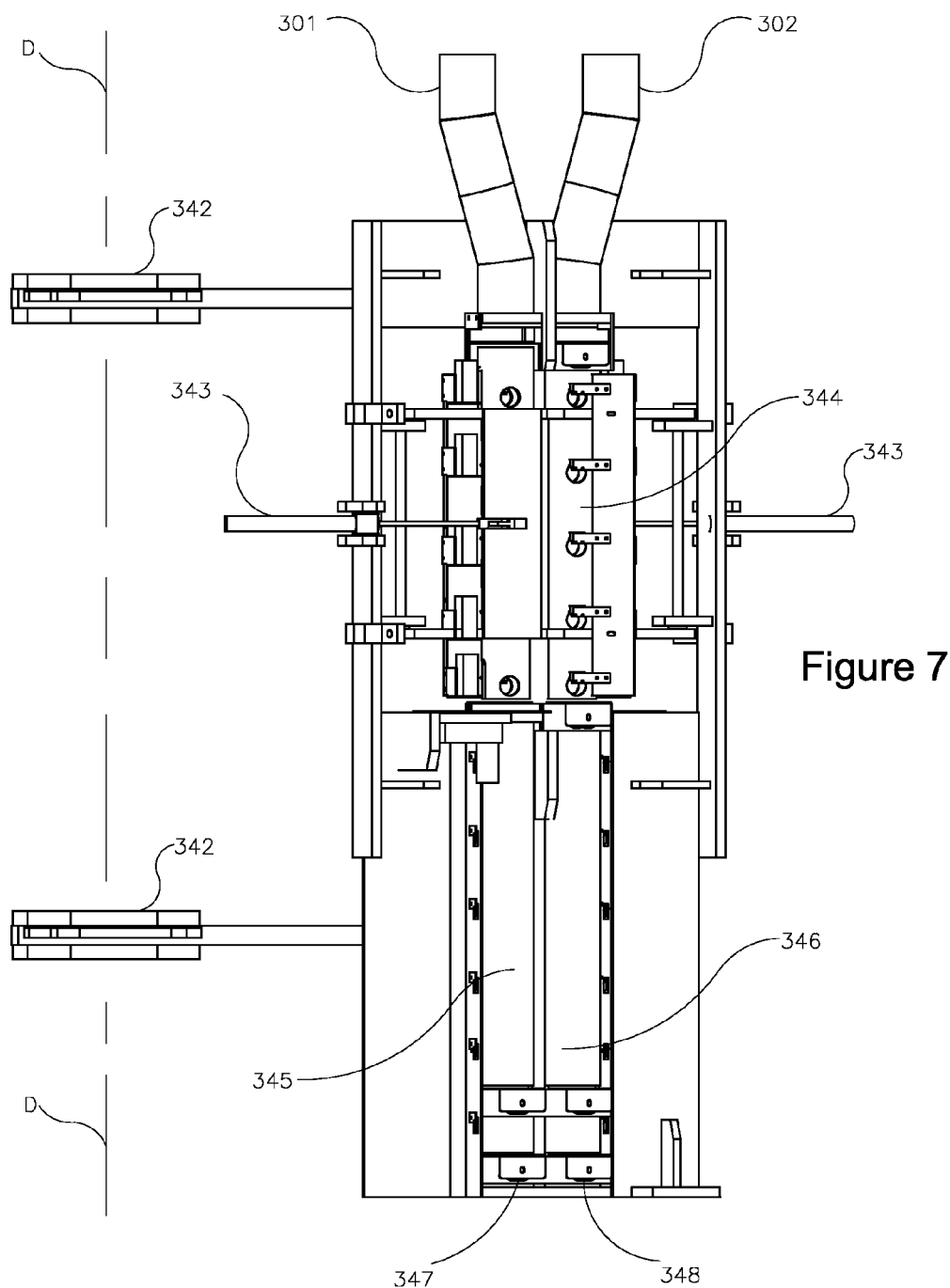
FIG. 7 shows in front elevational view an incident container accumulator on the dispensing station of the present invention.
Figure 8A:
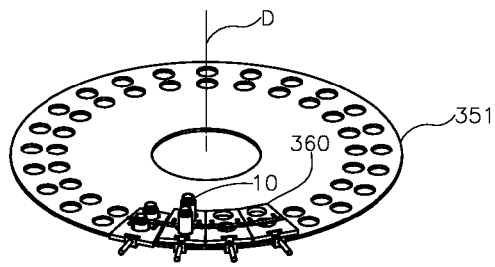
FIGS. 8A-8D show in perspective views component parts of the dispersion wheel of the present invention.
Figure 8B:
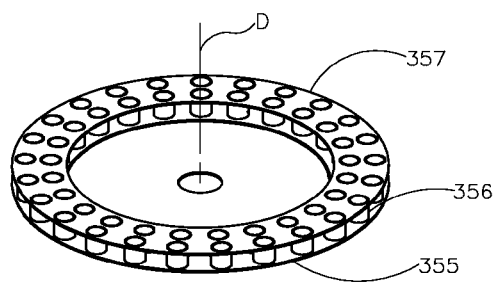
Figure 8C:
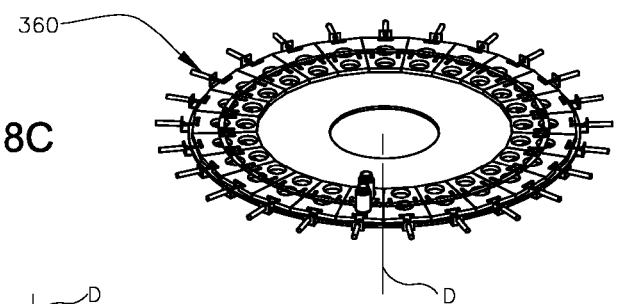
Figure 8D:
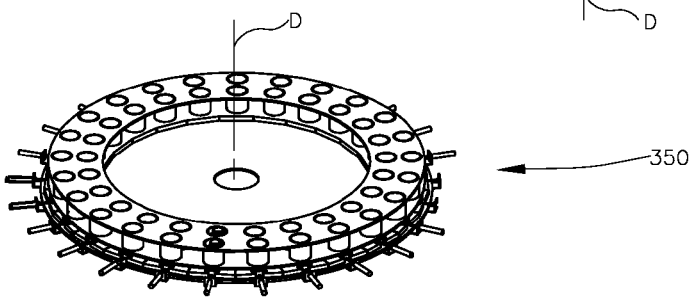
Figure 10:
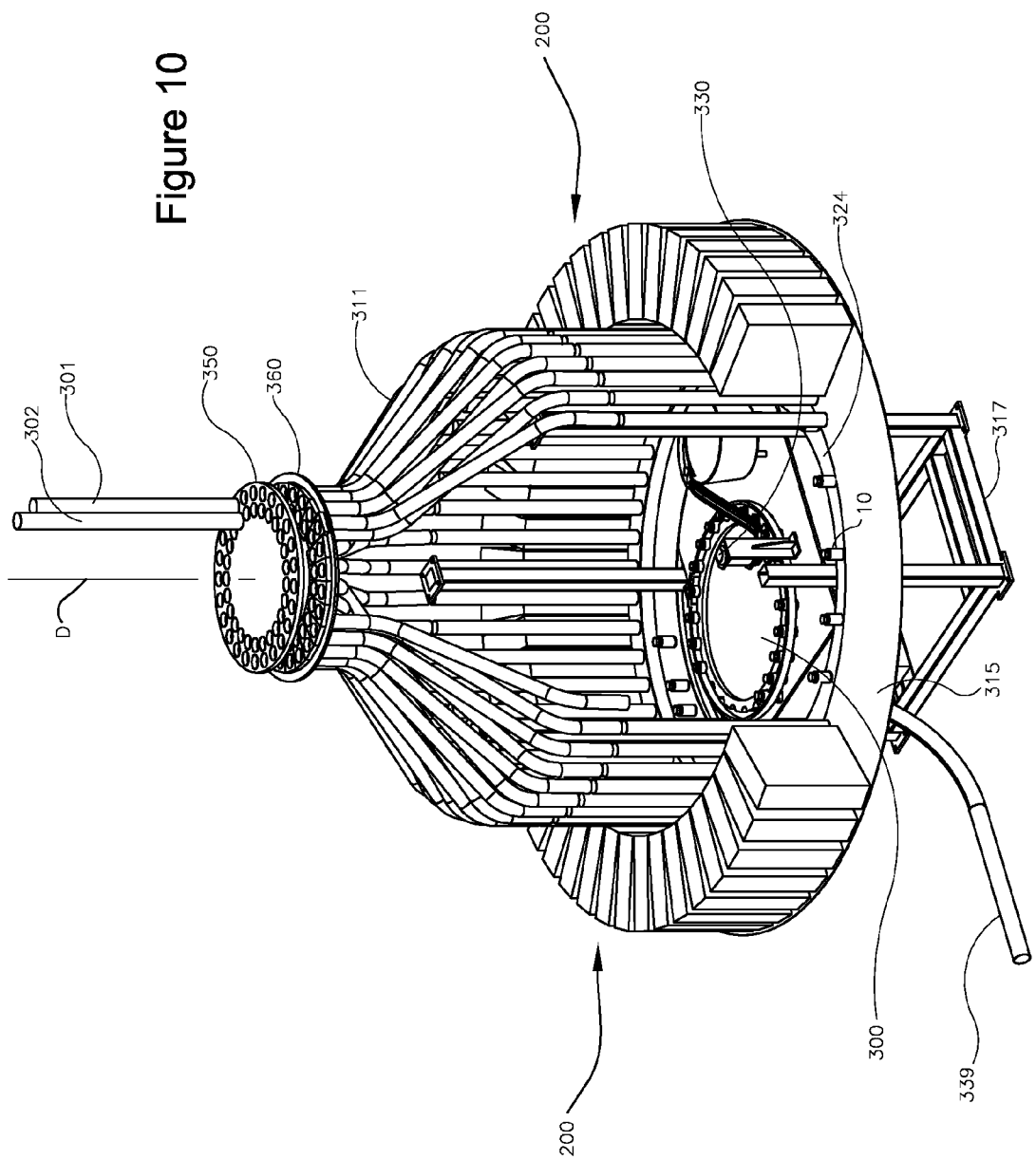
FIG. 10 shows in quartering perspective view the lower portion of the prescription container filling stage of the of the present invention, partially opened to reveal the container transport table and automatic closure and sealing apparatus inside.

Referring now also to FIGS. 5, 6 and 10, dispensing station 300 comprises a lower level (FIG. 10) and coaxial upper level (FIG. 5), the latter stacked upon the former. Both levels are supported by lower base 317. Structural members (not shown) couple upper base 359 to lower base 317 which supports the entire weight of station 300. Upper base 359 in turn supports column 303 coaxial with axis D of station 300.

Figure 12B:
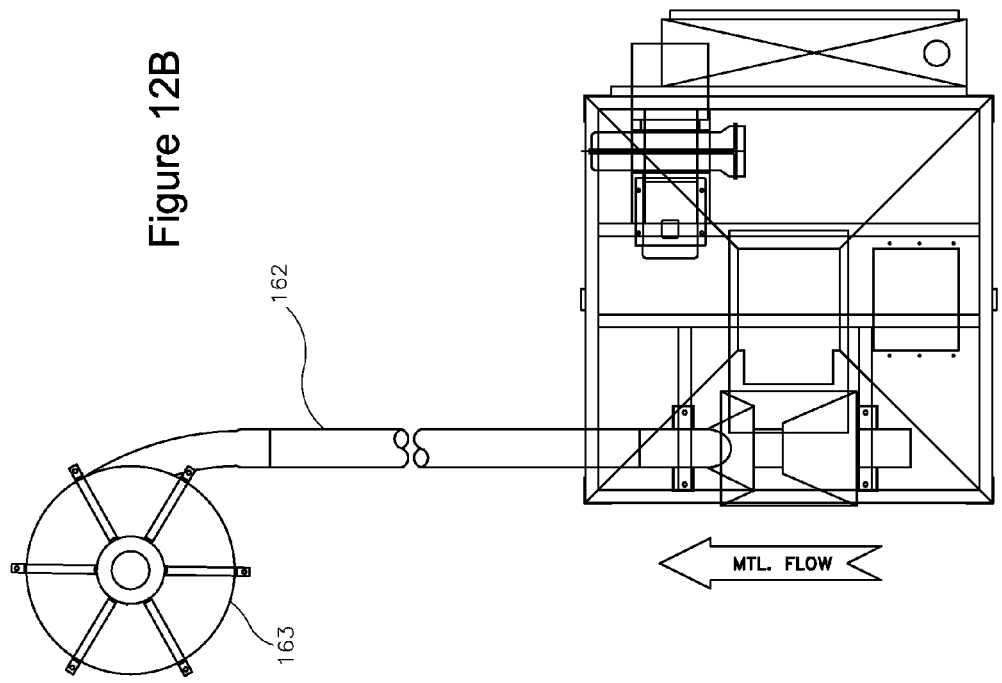
FIGS. 12A-14 detail apparatus and process by which filled prescription containers are automatically sealed for shipment.
Figure 12A:
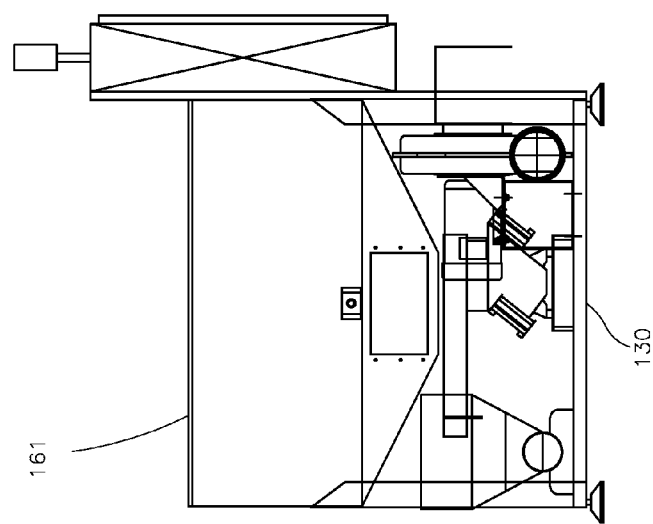

Disposed atop column 303, decelerator 163 receives caps 50 directed to it by cap inductor 161 (FIGS. 12A, 12B). Column 303 houses duct 304 which conveys bottle caps 50 from cap decelerator 163 through dispersion wheel 350 to capping bowl 164 in the lower level substantially coplanar with platform 315. The operation of capping system 330 inside dispensing station 300 is discussed below.

Disposed approximately three (3 ft.) feet above the floor on lower base 317, annular platform 315 houses a plurality of pharmaceutical dispensers 200 arrayed concentrically around axis D and facing the interior of station 300. Dispensers 200, the subject matter of a separate, previously filed patent application (see above), are discussed briefly herein below (see FIG. 11) in connection with filling of bottles 10 with pharmaceuticals P. Bottle accumulator chutes 311 extend upward to dispersion wheel 350 (discussed in detail herein below) to receive bottles 10 one at a time as system 1000 directs them to a particular dispenser 200 for filling. Chutes 311 comprise cylindrical tubes very similar to tubes 103, and accumulate bottles 10 awaiting filling by dispenser 200, as discussed below. Once filled, bottles 10 move into the interior of station 300 to be capped, as discussed in more detail below, and then exit station 300 through outlet tube 339 to be urged toward verification stage 400 by pneumatic impeller 130.

Dispersion Wheel

Bottles 10 arrive at dispensing station 300 into one or the other of incoming channels 301, 302 and proceed to accumulator 340 which entrains bottles 10 for filling by dispensers 200. Actuators 343 coupled to doors within accumulator 340 operate upon direction by system 1000 to drop bottles 10 into dispersion wheel 350. Accumulator 340 is supported on column 303 by brackets 342 which align accumulator 340 with cups 356 evenly disposed in radially arrayed pairs around the perimeter of dispersion wheel 350. Accumulator 340 also includes sensors 344 adapted to read indicia 9 on labels 2 to provide system 1000 with feedback to confirm the location of each of bottles 10.

Disposed directly below accumulator 340 and coaxial about axis D, dispersion wheel 350 comprises lower, circular dispersion plate 355 and upper, circular retaining ring 357. Dispersion plate 355 and retaining ring 357 sandwich and support cups 356 in radially arrayed pairs around the perimeter of dispersion wheel 350. Cups 356 are open through both lower plate 355 and upper ring 357 to form conduits through dispersion ring 350 for bottles 10. Cups 356 thus admit bottles 10 from accumulator 340 and hold them upright with their bottoms 20 resting upon gates 360. Gates 360 prevent bottles 10 from passing out of dispersion wheel 350 until directed by system 1000 to open and drop bottles 10 into chutes 311, as discussed below.

Each of gates 360 is poised above two of chutes 311 of two dispensers 200. Gates 360 rest upon stationary dispersion base plate 351 disposed directly beneath dispersion wheel 350. Exit apertures 353, 354 in base plate 351 align with chutes 311 leading to dispensers 200. Apertures 353, 354 are disposed in radially arrayed pairs with which cups 356 on dispersion wheel 350 align so that bottles 10 in cups 356 may drop into columns 311 when released.

Figure 9:
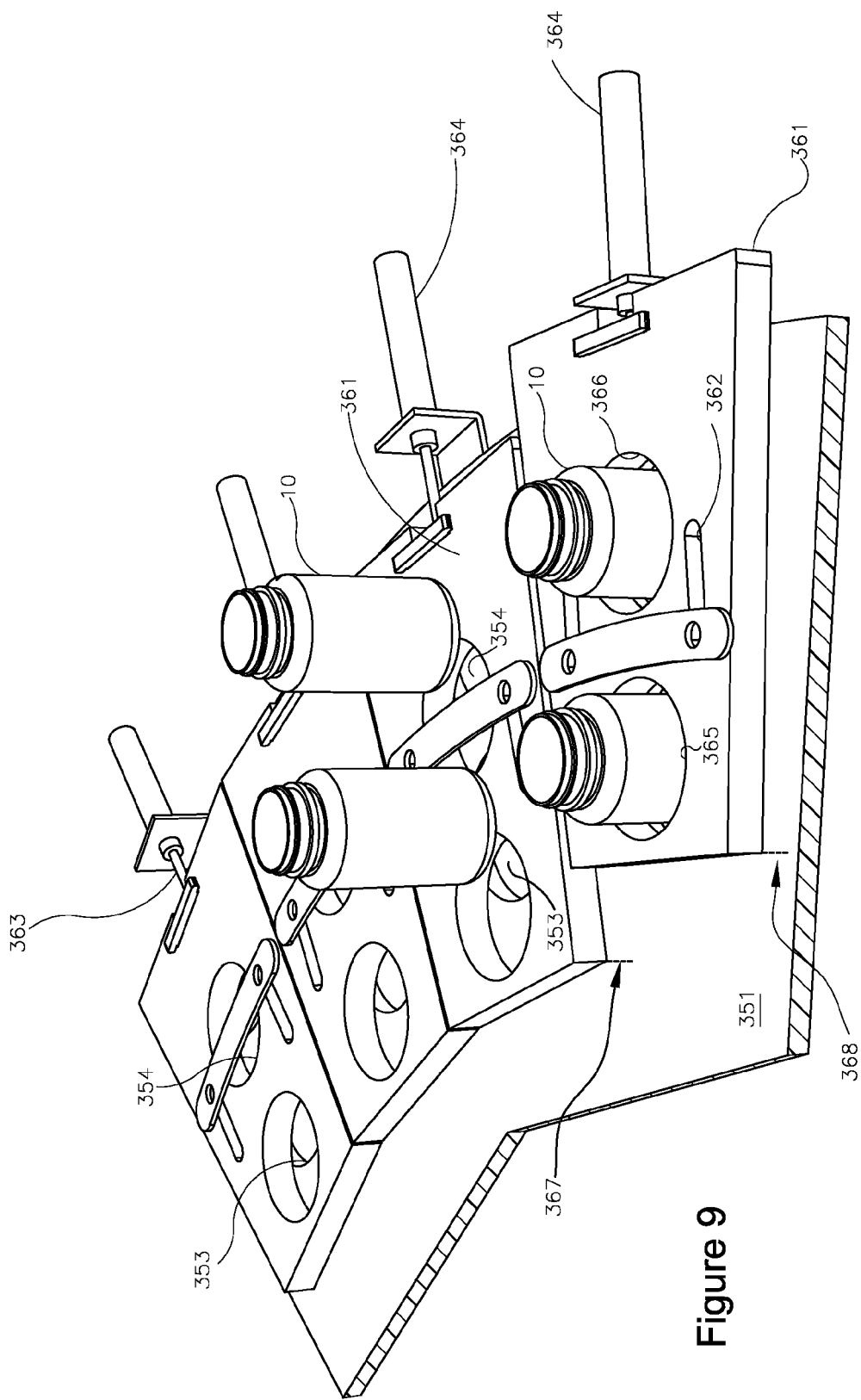
FIG. 9 depicts in perspective view a close-up of container gates used in the dispersion wheel of FIGS. 8A-8D.

Gates 360 comprise horizontally disposed, trapezoidal doors 361 adapted to articulate between radially opposing positions 367, 368 in response to actuators 364 operated by system 1000. Positions 367, 368 (FIG. 9) represent open and closed states for apertures 353, 354. Doors 361 surround and define ports 365, 366 which align with apertures 353, 354 when doors 361 are in position 368 and which are offset from apertures 353, 354 when doors 361 are in position 367.

Thus, when bottle 10 sitting atop gate 360 is to be dropped into one of chutes 311, gate 360 operates to shift door 361 from closed position 367 to open position 368, thereby aligning ports 365, 366 with apertures 353, 354 respectively and allowing bottle 10 to drop through door 361 into column 311. Once bottle 10 has cleared gate 360 and has arrived at dispenser 200, as determined by sensors located at dispenser 200, gate 360 closes and dispersion wheel 350 rotates to align another bottle 10 with another of columns 311.

Figure 14:
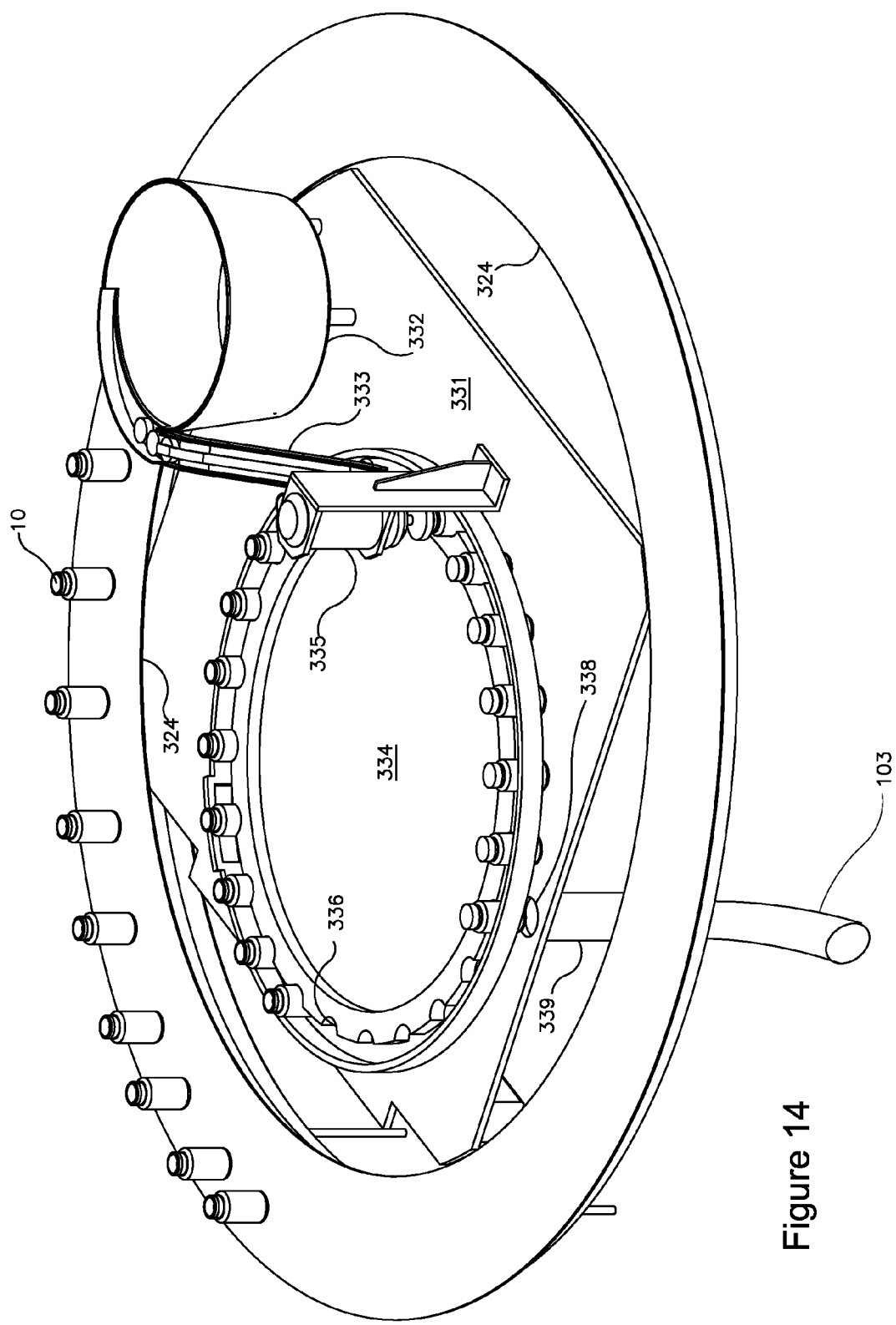

To position each bottle 10 above the correct dispenser 200 containing pharmaceutical P required for it, dispersion wheel 350 rotates about axis D while bottles 10 held in cups 356 slide along the upper surface of gates 360 (as best seen in FIG. 14). Motor 358 (FIG. 6) disposed beneath stationary base plate 351 rotates dispersion wheel 350 axially around column 303 and axis D until bottle 10 aligns with dispenser accumulation column 311 associated with dispenser 200 to which bottle 10 has been directed by system 1000. Dispersion wheel 350 can move in both clockwise and counterclockwise directions to minimize the distance bottles 10 must move between accumulator 340 and the appropriate gate 360. Further, both rows of cups 356 may contain one or more bottles 10 to optimize the operation of dispersion wheel 350. Not all cups 356 will contain bottles 10 at one time, however, because that could lead to excessive wear on bottoms 20 of bottles 10. System 1000 includes optimizing routines for deciding when to drop bottles into which cups 356 and which direction and how much to rotate dispersion wheel 350 to maximize throughput of bottles 10 with the least amount of wear.

Pharmaceutical Dispensing

Figure 11:
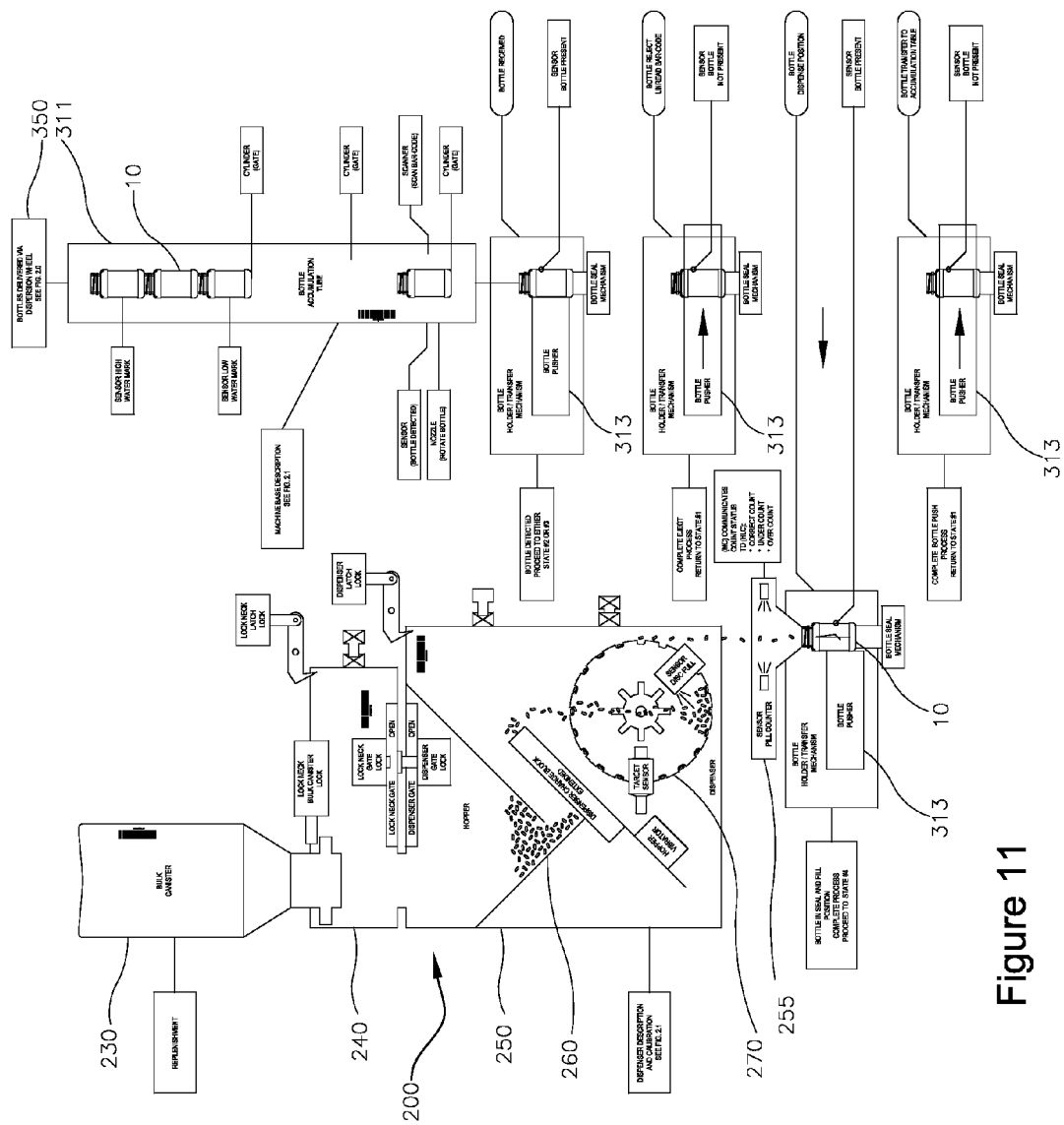
FIG. 11 shows a schematic of one of the pharmaceutical dispensing machines of FIG. 10, including the process by which containers are filled.

Referring now to FIG. 11, dispenser 200 comprises a substantially rectangular cabinet which contains hopper 260 holding a quantum of pharmaceuticals P admitted thereto from canister 230. Canister 230 couples to dispenser 200 through lock neck 240 which contains gates which will not open until system 1000 confirms that pharmaceuticals P contained in canister 230 are those which are intended to be dispensed by dispenser 200. This is confirmed by scanning bar codes on canister 230, lock neck 240 and dispenser 200, all of which should be predetermined by system 1000 to be mated as shown. Once this is confirmed, lock neck 240 opens and admits the entire volume of pharmaceutical P contained in canister 230 into hopper 260 to be dispensed one at a time by dispensing disk 270 into bottles 10.

Bottles 10 arrive in dispenser accumulation chutes 311 and stack up until they are urged one at a time by bottle pusher 313 beneath the outfall of dispenser 200. When bottle 10 arrives in column 311 and its turn comes to be filled, four potential states can occur. First, system 1000 reads indicia on label 2 and compares it with the bar codes on dispenser 200 to verify that bottle 10 is supposed to be filled with pharmaceuticals from dispenser 200. If not, bottle 10 is ejected, and a new bottle 10 is prepared at labeler 120 for the missing prescription.

If indicia 9 indicates bottle 10 is supposed to be filled by dispenser 200, bottle pusher 313 moves bottle 10 beneath sensor 255 to be filled. As disk 270 rotates to drop individual pills of pharmaceutical P into bottle 10, sensor 255 counts them to verify that bottle 10 receives the proper number of pills of pharmaceutical P, whereupon disk 270 stops and bottle pusher 313 extracts bottle 10 and urges it onto rotating table 324 (FIGS. 10, 13A, 13B) while another bottle 10 drops into place in bottle pusher 313 to be filled at dispenser 200.

Bottle Capping System

Referring now to FIGS. 10, 12A, 12B, 13A, 13B and 14, bottle capping system 330 closes bottles 10 by automatically installing cap 50. Caps 50 enter dispensing station 300 through decelerator chamber 163 atop column 303. As best seen in FIGS. 1, 2, caps 50 enter system 1000 at bulk hopper 161 where they are inducted into system 1000 in bulk. Hopper 161 then propels caps 50 through feed line 162 to dispensing station 300 decelerators 163, passing through diverters 140 as necessary. In decelerator 163, caps 50 slow and fall through duct 164 into cap bowl feeder 166 from whence they are righted and fed individually through conveyor 333 to automatic bottle capper 335 inside the lower level of dispensing station 300 (FIGS. 10, 12A). A suitable capper 335 is available commercially.

As bottles 10 leave dispensers 200, they move onto annular, moving turntable 324 which rotates around axis D continuously until stopped by system 1000. As bottles 10 travel around axis D, they are captured by entrance conveyor 327 and urged into capping wheel 334 which incrementally rotates to place first one bottle 10 after another under capper 335 to receive cap 50.

Figure 13A:
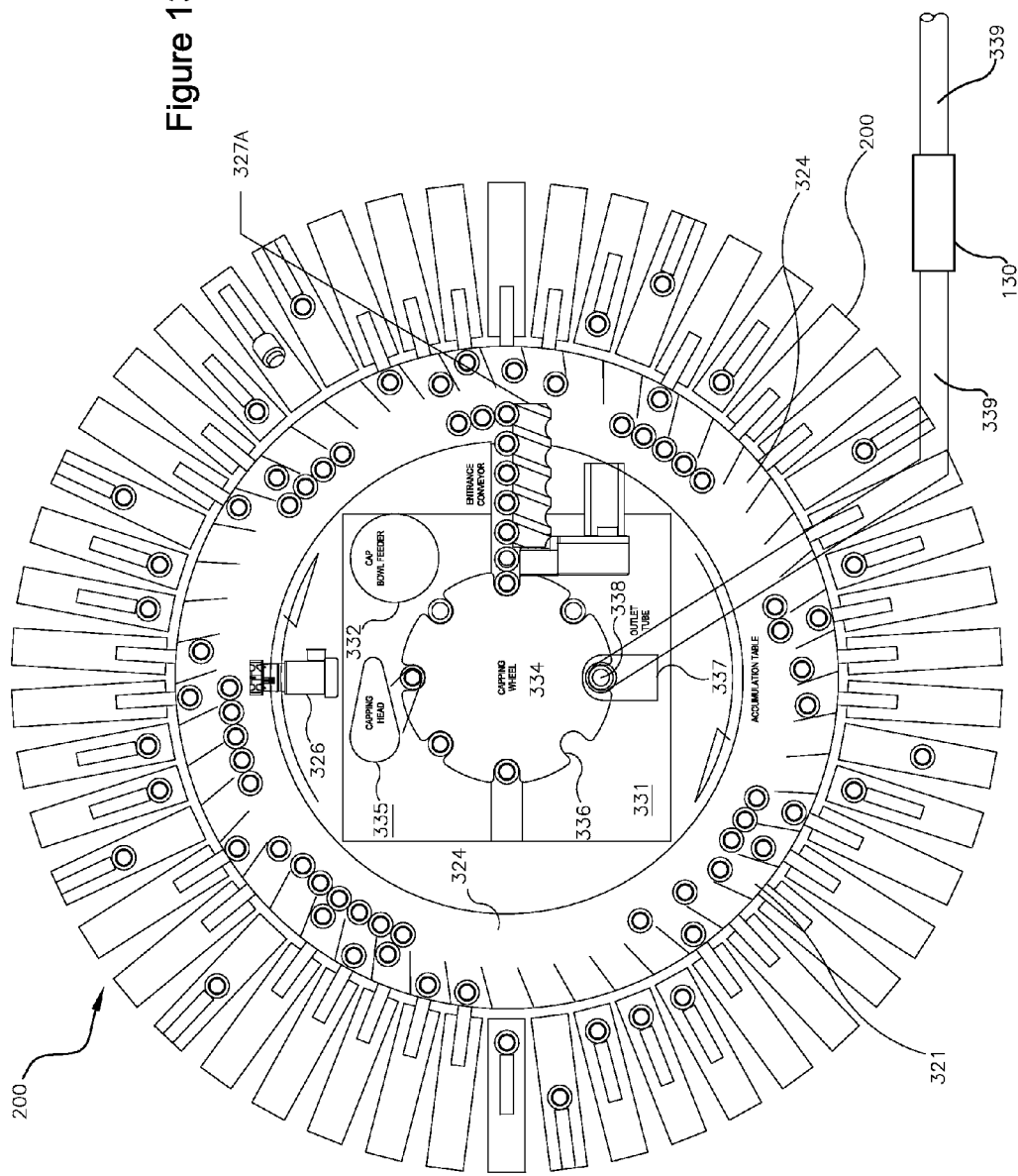
Figure 13B:
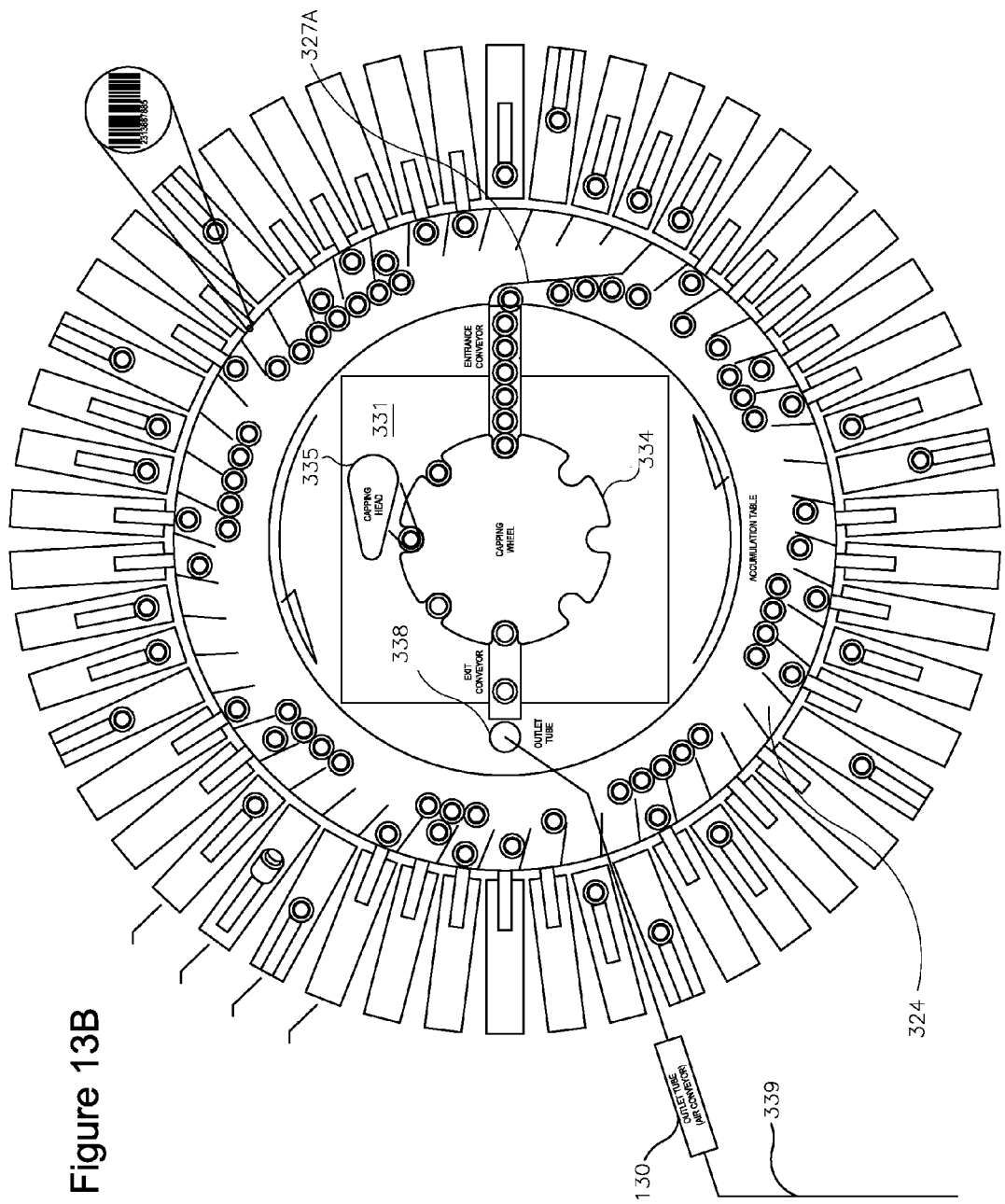

FIGS. 13A, 13B demonstrate two alternate embodiments for entrance conveyor 327. In FIG. 13A, entrance conveyor 327A comprises motor driven worm gear 329 with teeth adapted to surround walls 11 of bottles 10 and urge them radially inward from table 324 to capping wheel 334. In FIG. 13B, entrance conveyor 327B comprises baffle 328 disposed diagonally across table 324 which slidably diverts bottles 10 radially inward toward capping wheel 334. Entrance conveyors 327A, 327B each have advantages. Conveyor 327B is simple and requires few moving parts, the movement of bottles 10 being a consequence of the rotation of table 324. Conveyor 327A's separately controlled worm gear 329 permits system 1000 to control bottles 10 more precisely as they enter capping wheel 334 without having to stop or regulate rotation of table 324. One having ordinary skill in the art will recognize that all bottle conveyor systems for the purpose, including conveyors 327A, 327B, are considered to be within the spirit and scope of the present invention.

As best seen in FIG. 14, bottles 10 are captured by capping wheel 334 in notches 336 and incrementally moved into position for capping beneath capper 335. Caps 50 enter capper 335 from bowl feeder 166 on cap chute 333 and capper 335 threads them onto bottles 10, thereby sealing bottles 10 with pharmaceuticals P inside. Capping wheel 334 continues to move capped bottles 10 around its perimeter until they fall through outlet 337 into outlet tube 339 on their way to verification stage 400.

Dispensing station 300 of the present invention thus brings together bottles 10 labeled with indicia 9 signifying a particular patient's prescription with the pharmaceuticals that are to be dispensed into them. Station 300 makes very efficient use of pharmacy floor space, having a large array of dispensers 200 arrayed around a single capping machine. Empty bottles 10 directed by system 1000 to station 300 are dropped into dispersion wheel 350 which rotates to drop each bottle 10 to its assigned dispenser 200 without taking up any more floor space.

While the invention has been particularly shown and described with reference to preferred and alternate embodiments, it will be understood by those skilled in the art that various changes in form and detail may be made therein without departing from the spirit and scope of the invention. For example, though dispensing station 300 and dispensers 200 have been presented herein in the context of prescription filling of pharmaceuticals, they easily could be adapted to dispense any inventory of small objects, such as screws, nuts or other fasteners. Container 10 has been described as a bottle having dimensions convenient to the described pharmaceutical prescription application, but it could be considerably larger or smaller as required, either in similar pharmaceutical prescription filling systems or other applications, and it could be a container 10 having other shapes and characteristics which still cooperates with container transport system tubes 100 to move between stations 300, 400, 500 and 600.

I claim:

1. A rotatable dispersion apparatus for dispersing objects to a plurality of destinations according to indicia borne on said objects, the objects being dimensionally stable and having walls bearing indicia identifying the destination to which said objects are to be dispersed, the dispersion wheel comprising
    an annular platform supported by a base and having a vertical axis;
    a plurality of conduits coupled to the platform, each conduit having an input port adapted to receive said objects one at a time, said conduits leading from the dispersion apparatus to a predetermined destination where said objects receive processing;
    coaxial annular lower and upper plates disposed a spaced distance apart above the annular platform;
    a plurality of cups sandwiched between said lower and upper plates, each cup forming a conduit between a pair of lower and upper openings surrounded and defined by said lower and upper plates, each of said cups being adapted to receive one of said objects and to be rotatably aligned with one of said input ports;
    a plurality of gate means disposed between said cups and said input ports and adapted articulate between an open position to admit an object from one of said cups into one of said input ports and a closed position blocking said input port and retaining said object within said cup; and
    controller means for operating said dispersion wheel.

2. The rotatable dispersion apparatus according to claim 1 and further comprising
    object entraining means for entraining said objects in sequence for entering said cups.

3. The rotatable dispersion apparatus according to claim 2 wherein said entraining means comprises
    at least one object accumulator disposed above said upper plate and having
        at least one entrance conduit through which a plurality of objects arrives at said dispersion apparatus;
        an exit conduit corresponding to each at least one entrance conduit and positioned above said upper plate and in alignment with one of said cups;
        a first actuator door disposed within said accumulator in alignment with said at least one entrance conduits;

a second actuator door disposed within said accumulator above said first actuator door and operable to
support a plurality of objects accumulating within said at least one entrance conduit; and
drop one of said objects onto said first actuator door in response to instructions from said controller means while retaining a remainder of said plurality of objects in said at least one entrance conduit; and
indicia reading means disposed between said first and second actuator doors enabling said controller means to read indicia on said objects and to determine an input chute to which to direct said object.

4. The rotatable dispersion apparatus according to claim 1 wherein each of the gate means comprises
a trapezoidal block disposed between said lower plate and at least one of said input ports, each of said trapezoidal blocks surrounding and defining at least one window adapted to be aligned with one of said cups; and
a gate actuator coupled to said trapezoidal block and operable by said controller means to articulate said trapezoidal block radially between said open position and said closed position.

5. The rotatable dispersion apparatus according to claim 1 wherein said plurality of gate means comprises
an annular disk substantially coextensive with said lower plate and coupled to said input ports, said annular disk surrounding and defining an aperture coaxial with each of said input ports;
a plurality of trapezoidal blocks disposed on said annular disk and across at least one of said apertures, said trapezoidal blocks surrounding and defining at least one window, each of said at least one windows adapted to
align with one of said at least one apertures when said gate means is in said open position; and
substantially cover each of said at least one apertures when said gate means is in said closed position; and
a gate actuator coupled to said trapezoidal block and operable by said controller means to articulate said trapezoidal block radially between said open position and said closed position.

6. The rotatable dispersion apparatus according to claim 1 wherein said small objects comprise
cylindrical containers, each of said containers having
a central axis surrounded by coaxial walls having a wall diameter and surrounding an interior, said coaxial walls bearing said indicia
at least one end wall transverse said cylindrical walls and closing said container at one end of said container;
access means for accessing said interior to introduce material into said interior, said access means adapted to be sealed once said material has been introduced into said interior; and
said cups comprise cylinders sized to surround and receive said containers and to hold them in an erect, vertical orientation substantially normal to said gate means and resting with one of said at least one end walls in contact with said gate means.

7. The rotatable dispersion apparatus according to claim 6 wherein said access means comprises
a mouth coaxial with said container opposite said at least one end wall, said mouth having a mouth diameter less than said wall diameter and bearing threads adapted to engage like threads within a cap for closing said container.

8. The rotatable dispersion apparatus according to claim 6 wherein said access means comprises
a second one of said at least one end walls disposed at a second one of said at least one ends of said container;
a mouth parallel to said axis and disposed within said wall opposite a hinge, said mouth adapted to open said container longitudinally; and
sealing means adapted to traverse said mouth to close and seal said container.

9. The rotatable dispersion apparatus according to claim 1 wherein the controller means comprises
a computer coupled to said rotatable dispersion apparatus and having a central processor, a quantum of random access memory, at least one dynamic data storage device, a graphical user interface and at least one user input device;
a computer program operable on said computer and adapted to
monitor said object indicia reading means on said entraining means to track a location and status of each object as it arrives at said dispersion apparatus;
identify which one of said input ports into which said object is to be directed;
operate said dispersion apparatus to align one of said cups beneath said object and to receive said object into said cup;
rotate said dispersion apparatus in a rotational direction determined by said computer program to minimize a quantity of time necessary to translate said one of said cups containing said object into alignment with said one of said input ports; and
operate said gate means to admit said object into said input port.

10. A dispersion wheel adapted to disperse containers to a plurality of destinations according to indicia borne on said containers, the containers having an interior surrounded by cylindrical walls, a transverse bottom closing said interior, a mouth opposite said bottom for admitting materials, and indicia borne on said container walls indicating the identity and quantity of said materials to be dispensed into said interior, the dispersion wheel comprising
an annular platform supported by a base and having a vertical axis;
a plurality of container conduits coupled to the platform, each container conduit having an input port adapted to receive said containers one at a time, said container conduits leading from the dispersion wheel to a predetermined destination where said containers receive dispensed materials;
coaxial annular lower and upper plates disposed a spaced distance apart above the annular platform;
a plurality of cylindrical cups sandwiched between said lower and upper plates, each cup forming a conduit between a pair of lower and upper openings surrounded and defined by said lower and upper plates, each of said cups being adapted to receive one of said containers and to be rotatably aligned with one of said input ports;
a plurality of gate means disposed between said cups and said input ports and adapted articulate between an open position to admit a container from one of said cups into one of said input ports and a closed position blocking said input port and retaining said container within said cup; and
controller means for operating said dispersion wheel.

11. The dispersion wheel according to claim 10 wherein each of the gate means comprises
    a trapezoidal block disposed between said lower plate and at least one of said input ports, each of said trapezoidal blocks surrounding and defining at least one window adapted to be aligned with one of said cups; and
    a gate actuator coupled to said trapezoidal block and operable by said controller means to articulate said trapezoidal block radially between said open position and said closed position.

12. The dispersion wheel according to claim 10 and further comprising
    container entraining means for entraining said containers in sequence for entering said cups.

13. The dispersion wheel according to claim 12 wherein said entraining means comprises
    at least one container accumulator disposed above said upper plate and having
        at least one entrance conduit through which a plurality of containers arrives at said dispersion wheel;
        an exit conduit corresponding to each at least one entrance conduit and positioned above said upper plate and in alignment with one of said cups;
        a first actuator door disposed within said accumulator in alignment with said at least one entrance conduits;
        a second actuator door disposed within said accumulator above said first actuator door and operable to
            support a plurality of containers accumulating within said at least one entrance conduit; and
            drop one of said containers onto said first actuator door in response to instructions from said controller means while retaining a remainder of said plurality of containers in said at least one entrance conduit; and
        indicia reading means disposed between said first and second actuator doors enabling said controller means to read indicia on said containers and to determine an input port to which to direct said container.

14. An improved method of directing pharmaceutical prescription bottles to one of a plurality of bulk dispensers of pharmaceuticals for filling said bottles according to a predetermined prescription indicia borne on said bottles, said plurality of bulk dispensers being disposed around an annular platform having a vertical axis, each of said bulk dispensers having a corresponding input conduit adapted to convey said bottles to said dispenser one at a time, said input conduits extending coplanar with said vertical axis to terminate in an input port above said platform, the method comprising
    providing a rotatable dispersion wheel coaxial with and disposed above the annular platform and coupled to said input conduits, the dispersion wheel having
        a plurality of cylindrical cups adapted to receive one of said bottles and to be rotatably aligned with one of said input conduits;
        a gate disposed above each of said input conduits and adapted to open to admit a bottle from one of said cups into one of said input conduits; and
        a servo motor coupled to said dispersion wheel and adapted rapidly to rotate said dispersion wheel either clockwise or counterclockwise around said vertical axis;
    providing a bottle accumulator disposed above said dispersion wheel and adapted to read said bottle indicia and to release said bottle into one of said cups; and
    providing controller means for operating said dispersion wheel; then
    operating said controller means to
    (a) direct each bottle into said accumulator; then
    (b) operating said bottle accumulator to read said bottle indica to determine a select one of said plurality of dispensers to which said bottle is to be directed; then
    (c) operating said bottle accumulator to drop said bottle into one of said cups in said dispersion wheel; then
    (d) rotating said dispersion wheel to translate said bottle to a position above said input conduit leading to said select one of said plurality of dispensers; then
    (e) operating said gate to drop said bottle into said input conduit leading to said select one of said plurality of dispensers; and then
    (f) repeating steps (a)-(e), inclusive, for each additional bottle.

15. The improved method of claim 14 wherein
    the controller means comprises
        a computer coupled to said dispersion wheel and said bottle accumulator, said computer having a central processor, a quantum of random access memory, at least one dynamic data storage device, a graphical user interface and at least one user input device; and a computer program executable on said computer to control said dispersion wheel and said bottle accumulator; and
    the improved method includes the following steps to be carried out in parallel with steps (a) through (f):
    (g) reading pharmaceutical and dispenser location indicia disposed on each of said dispensers to catalog a type and quantity of said pharmaceuticals available for dispensing at each dispenser location;
    (h) monitoring said dispensers to track quantities of pharmaceuticals dispensed from said dispenser locations;
    (i) displaying on said graphical user interface information indicating when said dispenser is nearing empty and halting further directing of bottles to said dispenser until said pharmaceuticals are replenished; and
    (j) storing in a database on said dynamic storage device a record of said contents of each of said bottles.

* * * * *